United States Patent [19]
Young

[11] 3,893,947
[45] July 8, 1975

[54] GROUP VI-B METAL CATALYST PREPARATION
[75] Inventor: Dean Arthur Young, Yorba Linda, Calif.
[73] Assignee: Union Oil Company of California, Los Angeles, Calif.
[22] Filed: Sept. 10, 1973
[21] Appl. No.: 395,624

[52] U.S. Cl. ............... 252/439; 252/465; 252/467
[51] Int. Cl. ..................... B01j 11/74; B01j 11/06
[58] Field of Search.................... 252/439, 465, 467

[56] References Cited
UNITED STATES PATENTS
| | | | |
|---|---|---|---|
| 2,697,066 | 12/1954 | Sieg | 252/465 X |
| 3,393,148 | 7/1968 | Bertolacini et al. | 252/439 X |
| 3,519,573 | 7/1970 | Coe | 252/439 |
| 3,692,698 | 9/1972 | Riley et al. | 252/439 |

FOREIGN PATENTS OR APPLICATIONS
| | | | |
|---|---|---|---|
| 1,317,683 | 1/1963 | France | 252/465 |

Primary Examiner—Patrick P. Garvin
Attorney, Agent, or Firm—Lannas S. Henderson; Richard C. Hartman; Michael H. Laird

[57] ABSTRACT

Catalytic combinations of refractory oxides and molybdenum and/or tungsten useful for hydrocarbon conversion and having modified porosity, permeability and/or surface characteristics are prepared by oxidizing a particle-form combination of a refractory oxide, a combustible support modifier and a Group VI-B metal compound in which less than 20 percent of the metal is hexavalent, by heating the particle-form combination in an oxidizing atmosphere at a temperature sufficient to convert the modifier to volatile oxidation products and remove it from the structure.

6 Claims, No Drawings

GROUP VI-BETA METAL CATALYST PREPARATION

BACKGROUND

Refractory inorganic oxides of the type used as catalyst supports are particularly suitable for that utility due to their tolerance of reaction and regeneration conditions, their active surface characteristics and porosity and permeability which foster ingress and egress of reactants and products. The physical characteristics of a support, such as porosity and permeability, can be controlled by manipulating several variables involved in the preparation of particle-form supports. However, the degree of control available by that means is sometimes not sufficient. Along this line previous investigators have found that voids, channels or desirable surface structure can be obtained by including combustible materials or support modifiers in the refractory oxide during compounding, and then later, after formation of the desired particle-form of the oxide, oxidizing the combination of oxide and support modifier under conditions sufficient to oxidize or combust the modifier converting it to volatile combustion products thereby forming channels, voids or other surface of bulk features.

However, I have discovered that attempts to form particulate catalysts having modified physical characteristics and containing Group VI-B components by this approach is subject to several notable disadvantages. For example, an extrudate containing a combustible modifier and hexavalent molybdenum or tungsten compounds, when heated in an oxidizing atmosphere to burn the combustible material, actually ignites and oxidizes so rapidly that the particles are fragmented. In fact, the heat of oxidation is so great that once the reaction is initiated at one extremity of an elongate extrudate, it will propogate to the unheated end as a visually apparent incandescent reaction front. The reaction is accompanied by such excessive heat release that the extrudate is fragmented into various small pieces or powder, vapors are released, and numerous glowing fragments are expelled from the particle.

This problem can be avoided by compounding the refractory oxide and support modifier, forming the desired particles from that combination in the absence of hexavalent Group VI components, oxidizing the modifier to produce the desired support and then adding the hydrogenation components by impregnation or mulling. However, mulling must be avoided or restricted to at most only nominal severity to avoid crushing the particles. Thus, this approach limits the available methods of catalyst preparation to impregnation of the hydrogenation components.

In many respects this limitation is a decided disadvantage since active catalysts can be more conveniently and simply prepared by comulling or coprecipitating the hydrogenation components or precursors together with the refractory oxide before forming the catalyst particle. This procedure involves a simpler sequence of steps and produces a distribution of hydrogenation components throughout the particle which cannot easily be obtained, if at all, by subsequent impregnation.

It is therefore one object of this invention to provide an improved catalyst preparation method. It is another object to provide a method for producing particle-form catalytic combinations of refractory oxides and Group VI-B metal components. It is another object to provide a method for modifying the physical characteristics of catalysts containing refractory oxides and Group VI-B metal components.

DESCRIPTION OF SPECIFIC EMBODIMENTS.

In accordance with one embodiment the catalyst is prepared by forming the desired particulate shape of a combination of a refractory oxide, Group VI-B hydrogenation component and a combustible support modifier, wherein less than about 20 percent of a Group VI-B metal is hexavalent, and oxidizing the modifier by heating the particle-form combination in an oxidizing atmosphere to a temperature of at least about 600°F sufficient to convert the support modifier to volatile oxidation products.

In another embodiment the refractory oxide, oxidizable support modifier and Group VI-B metal compound containing hexavalent molybdenum and/or tungsten are formed into the desired particle shape and the Group VI-B metal compound is then reduced by reaction with a reducing agent under conditions sufficient to reduce the relative concentration of hexavalent molybdenum or tungsten to less than about 10 percent based on the total Group VI-B metal content of the combination prior to oxidizing the support modifier.

In accordance with another embodiment the refractory oxide, preferably in the form of a hydrogel or hydrosol, is intimately mixed with a compound of hexavalent molybdenum or tungsten and a combustible support modifier. The combination is formed into the desired particle shape by extrusion, pelleting or the like and is then subjected to reducing conditions to convert the hexavalent molybdenum or tungsten to lower valence states prior to oxidation of the support modifier.

This procedure is applicable to all forms of catalyst particles containing molybdenum or tungsten, a refractory inorganic oxide and a combustible support modifier. The modifier and hydrogenation component can be distributed throughout the refractory oxide by any procedure capable of producing the desired distribution of such material. For example, molybdenum or tungsten compounds can be concentrated at either the surface of the interior or can be distributed homogeneously throughout the particles. Similarly, the modifier can be selectively distributed either at the particle exterior or interior or can be mixed with the refractory oxide in such a way that homogeneous distribution is obtained.

All of these factors will, of course, be determined by the properties desired in the finished particle. However, the applicability of this invention is not limited to those objectives in that it has utility in every case involving these components. Similarly, other components can be added which do not interfere with the interaction of the Group VI-B components and the support modifier.

The essential characteristics of this invention derive from the observation that hexavalent molybdenum and tungsten compounds apparently accelerate the oxidation rate of combustible modifiers and reduce the temperature at which rapid oxidation is initiated. For example, I have observed that extremely rapid oxidation of both organic and inorganic modifiers such as polyglycols and sulfur is induced by hexavalent molybdenum on alumina at temperatures as low as 300°F, usually between about 250° and about 350°F. Obviously, even more rapid oxidation would result at higher temperatures.

Essentially any natural or synthetic, crystalline or amorphous refractory oxide can be used in these compositions. Illustrative materials include alumina, silica, magnesia, beryllia, zirconia, titania, and amorphous and crystalline combinations of these or other materials such as natural clays such as kaolin and the crystalline aluminosilicate zeolites of which zeolites A, X, Y, L, and Omega are illustrative.

Similarly, any reducible compound of molybdenum or tungsten can be used which can be converted to a catalytic form such as the metal, oxide or sulfide. Illustrative Group VI-B metal compounds which can be used to produce these compositions include the oxides, sulfides and thermally decomposable compounds. For purposes of convenience and in view of the thermal stability of most catalyst supports, the preferred Group VI-B compounds are those which can be thermally decomposed by calcining at temperatures above about 600°F, usually between about 600° and 1200°F. Illustrative compounds suitable for forming these combinations are the halides, oxyhalides, sulfides, sulfates, oxysulfides, nitrates, phosphates, carbonyls and compositions wherein the molybdenum or tungsten are present as anions, e.g. molybdates or tungstates, including ammonium molybdates and tungstates, alkali metal and ammoniumphosphomolybdates and tungstates, and complex transition metal molybdates or tungstates, phosphomolybdates and phosphotungstates such as nickel phosphomolybdate, cobalt tungstate and the like.

The Group VI-B compound can be combined with the refractory oxide either before or after addition of the combustible modifier. Admixture can be accomplished by comulling soluble or insoluble molybdenum or tungsten compounds with refractory oxide gels or sols prior to particle formation, or by impregnation of the formed particles with aqueous solutions of water soluble molybdenum or tungsten compounds. However, this invention is particularly useful for the production of particle-form catalysts. by comulling the refractory oxide and soluble or insoluble molybdenum or tungsten compounds prior to particle formation.

Numerous combustible support modifiers are known in the art. The characteristics of these materials are not critical to this invention beyond the requirement that they can be readily oxidized or burned and converted to volatile oxidation products at temperatures above about 600°F. Thus for the present purpose, the terms oxidizable or combustible support modifiers are intended to connote materials such as those described that can be combusted or oxidized to volatile products, e.g. $CO_2$, CO, $H_2O$, etc., in the presence of oxygen at temperatures above about 600°F. The modifiers can be either synthetic or naturally occurring materials such as sulfur, cellulose fibers such as wood, cotton or other vegetable fibers, carbon, and various natural and synthetic oxidizable organic polymers such as polyglycols, polyacrylamides, polyesters, polyolefins and the like.

The properties essential to the utility of natural or synthetic polymers as combustible modifiers are well known. They can be conveniently defined by reference to the function they perform in producing a support having porosity, permeability or other surface or bulk characteristics which are determined at least in part by oxidation and removal of the modifier. It is presently preferred that the polymers have a plastic or solid consistency at ambient temperatures, e.g., 80°F. Obviously, they must also be convertible to volatile oxidation or combustion products, e.g. $CO_2$, water and the like, in an oxidizing atmosphere at temperatures that do not degrade the support. Such temperatures are usually in excess of 600°F and can be as high as 1400°F. In fact, it is one of the primary objects of this invention to provide a catalyst preparation procedure whereby the rate of oxidation is controlled at an acceptable level that does not produce extreme local or bulk temperatures.

Many of the more convenient forms of molybdenum and tungsten are hexavalent compounds of the metals, some of which are mentioned above. However, the presence of hexavalent molybdenum or tungsten must be minimized during oxidation of the support modifiers. Moreover a very convenient procedure for obtaining a homogeneous distribution of hydrogenation components, support modifiers, and support involves comulling or otherwise mixing these components prior to particle formation.

for these reasons the preferred procedure involves the comulling or otherwise mixing hexavalent Group VI-B metal compounds with the unformed oxide and reducing the hexavalent compounds to lower valence forms before oxidizing of the support modifier. In accordance with this procedure a particle-form aggregate such as an extrudate, pellet, bead, tablet, die-cast particle or the like is formed from a combination of the refractory oxide, support modifier and hexavalent molybdenum or tungsten compound. The Group VI-B metal compound is then reacted with a reducing agent under conditions sufficient to reduce the concentration of hexavalent molybdenum or tungsten to less than 20 percent, usually less than 10 percent and preferably less than 5 percent, based on the total Group VI-B metal content.

A variety of reducing agents and conditions are known which will effectively reduce hexavalent molybdenum and tungsten compounds. The exact nature of these reducing agents and the conditions they are reacted with the Group VI-B metal components are not critical nor do they represent the substance of this invention.

The extend of reduction obtained with any combination of agents and conditions can be readily determined by known analytical techniques such as titration with permanganate iodate. Illustrative of these reducing agents are hydrogen sulfide, hydrazine, aldehydes, e.g. formaldehyde, acetaldehyde, etc., ammonium sulfide, ketones such as hydroquinone, and inorganic materials including readily oxidizable reactive metals powders such as molybdenum, tin and aluminum, and readily oxidizable reducing metal salts such as the ferrous, stannous, titanous and cerous salts such as the nitrates, sulfates, halides, and the like.

The conditions required to obtain the desired degree of reduction are, of course, a function of the reducing agent employed. These conditions can be readily determined by reacting the combination of Group VI-B compound and refractory oxide with a variety of reducing agents under a variety of conditions and determining analytically be electron spin resonance or similar means whether or not the required amount of reduction has taken place. The particulate combination is then calcined in an oxidizing atmosphere such as air at a temperature of at least 600°F for a period, e.g. at least about 30 minutes, sufficient to oxidatively convert the support modifier to volatile oxidation products.

The amount of modifier employed in these compositions can vary considerably depending upon the characteristics of the modifier and the properties required in the final particle. In most instances, the amount of modifier will exceed about 1 weight percent based on the total composition prior to oxidation. Higher porosity and permeability can be obtained with higher concentrations.

Hydrogenation component content can also vary substantially and is a function of the intended utility. In most applications the Group VI-B component concentration will be at least about 2, generally above 5, and preferably between about 5 and 40 weight percent determined as the corresponding oxide.

As is generally well known in the art, these compositions can also contain other materials which can be either catalytic themselves or can be catalyst modifiers or adjuvants, or inerts. Exemplary additional catalytic materials include the iron group metals, e.g. nickel, cobalt and iron, and the noble metals such as platinum and palladium, and their compounds. These materials can be added by impregnation, ion exchange, cogellation, comulling or the like. They are usually present in amounts ranging from 0.2 up to 20 weight percent determined as the metal.

EXAMPLE 1

A comparison catalyst containing 4.0 weight percent nickel (NiO) and 17.0 weight percent molybdenum (determined as molybdic oxide) on alumina was prepared by comulling boehmite alumina with nickel carbonate and ammonium molybdate. The ammonium molybdate was first dissolved in water. Mulling was continued with sufficient water to produce a formable paste until a homogeneous mixture of all the components was obtained. The paste was then extruded into 1/16 extrudates. Calcination of this material in air at 900°F produced no evidence of rapid exothermic decomposition sufficient to form localized hot spots or fragment the extrudates. Extrudate temperature was determined with a thermocouple imbedded in the particle container.

EXAMPLE 2

A composition identical to that described in Example 1 was prepared by the same procedure with the exception that 7.0 weight percent polyethylene glycol was comulled with the mixture. The polyethylene glycol was Carbowax-4000 marketed by Union Carbide Corp., 270 Park Ave., New York, N. Y., 10017.

A first part of this composition was calcined in air at 900°F without any preliminary treatment. Violent reaction was observed in the extrudates long before they reached the calcination temperature of 900°F. Catalyst temperature at the onset of this reaction was about 375°F. The reaction generated steam, shattered the extrudates and produced numerous glowing fragments which were obviously the result of an extremely rapid oxidation.

A second portion of this composition was pretreated with a mixture of 14 volume percent $H_2S$ in hydrogen for two hours while gradually heating the extrudates from 75°F to 950°F. The extrudates were then cooled and calcined in air at 900°F as was the first portion of the catalyst. No reactions were observed that gave any evidence of rapid oxidation, localized overheating, extrudate fragmentation or the like.

A third portion was heated in a hydrogen atmosphere in the absence of hydrogen sulfide or oxygen. Upon calcination in air extreme reactions and particle fragmentation were once more observed.

A fourth portion was aged at moderately elevated temperatures, e.g. 230°F for 16 hours. This pretreatment had no effect. The particles exhibited the same extreme reactions, particle fragmentation and exothermic oxidation observed in the first instance.

EXAMPLE 3

A third composition was prepared in the manner described in Example 1 and contained the same amounts of nickel and molybdenum. Sublimed sulfur powder (10 weight percent based on the dry weight of the final composition) was added to the composition during mulling. This material was subjected to the pretreatment and calcination described in Example 2.

The same results were observed in each instance. The material pre-reduced with hydrogen sulfide was successfully calcined in air at 900°F without any evidence of violent exothermic oxidation or particle fragmentation. In contrast, the samples finally calcined in air without pre-reduction exhibited the same extremely rapid exothermic oxidation, particle fragmentation and vapor emission observed in Example 2.

The temperature of the extrudates during calcination was monitored as in Example 2 by a thermocouple implanted in the pellets in the furnace. Visual observations of the pellets during calcination indicated that the induction temperature at which rapid oxidation commenced was about 250°F.

EXAMPLE 4

A composition containing 3.0 weight percent cobalt (CoO) and 12.0 percent molybdic oxide was prepared as described in Example 1. The comparison material contained no support modifier. Extrudate temperature was monitored with a thermocouple implanted in the pellets during heating to 1200°F. Visual inspection did not detect the presence of any induction temperature, particle fragmentation, or other evidence of rapid oxidation.

EXAMPLE 5

A portion of the boehmite alumina paste containing ammonium heptamolybdate and cobalt nitrate employed to make the extrudates in Example 4 was combined with 7.0 weight percent polyethylene glycol (Carbowax-4000) on a dry weight basis. Separate portions of this material were heated in air to 1200°F following different pretreatments including reduction with 14 percent $H_2S$ in hydrogen, pretreatment with hydrogen alone, and prolonged aging for 16 hours at 230°F. As was the case in Example 2, all of the samples that were not pre-reduced with hydrogen sulfide exhibited violent exothermic oxidation accompanied by particle fragmentation and vapor evolution. The onset of these reaction appeared to take place at an induction temperature of about 400°F.

EXAMPLE 6

A portion of the boehmite alumina paste containing cobalt nitrate and ammonium molybdate described in Example 4 was combined with 10.0 weight percent sublimed sulfur powder on a dry weight basis as described in Example 3. The paste was then extruded and tested as described in Example 2.

That portion of the composition reduced with hydrogen sulfide exhibited no induction temperature and was heated in air to 1200°F without any evidence of rapid exothermic oxidation or combustion, particle fragmentation or vapor evolution. In contrast, the portions of the extrudates that were not pre-reduced prior to heating in air exhibited the same evidence of rapid oxidation, particle fragmentation, vapor evolution and even actual explosion of glowing fragments observed in Example 2, 3 and 5. Visual observation and temperature monitoring indicated that the induction temperature was about 300°F.

Numerous variations and modifications of the concepts of this invention will be apparent to one skilled in the art in view of the aforegoing disclosure and the appended claims.

I claim:

1. A method for producing a particle-form catalyst consisting essentially of a refractory inorganic oxide support and a hydrogenation component, said hydrogenating component consisting essentially of at least one Group VI-B metal constituent selected from the group consisting of molybdenum, tungsten and catalytically active compounds thereof, which method consists essentially of forming a particle-form combination of said refractory oxide support, a combustible support modifier and at least one Group VI-B metal compound selected from the group consisting of the oxides, sulfides and thermally decomposable compounds of molybdenum, tungsten, or mixture thereof wherein at least about 80% of the total molybdenum and tungsten content is in a valence state below 6, and heating said combination in an oxidizing atmosphere to a temperature above about 600°F for a period sufficient to oxidize said support modifier.

2. The method of claim 1 wherein said combination contains at least about 1 weight percent of said support modifier and at least about 2 weight percent of Group VI-B metal oxide equivalent.

3. The method of claim 1 wherein said support modifier is selected from the group consisting of sulfur, carbon and natural and synthetic combustible organic polymers.

4. The method of claim 1 wherein said combination of said refractory oxide, said combustible support modifier and said Group VI-B metal compound is obtained by reducing a reducible compound of molybdenum or tungsten selected from the group consisting of the oxides, sulfides and thermally decomposable compounds thereof under conditions sufficient to reduce the relative concentration of hexavalent molybdenum or tungsten to less than about 10 percent of the total Group VI-B metal content of said combination prior to oxidizing said support modifier.

5. The method of claim 1 wherein said combination of refractory oxide, combustible support modifier and Group VI-B metal compound is obtained by forming a mixture of said refractory oxide, support modifier and a reducible Group VI-B metal compound selected from the group consisting of the oxides, sulfides and thermally decomposable compounds of hexavalent molybdenum or tungsten, reducing said Group VI-B metal compound under conditions sufficient to reduce the relative concentration of hexavalent molybdenum or tungsten to less than about 10 percent of the total Group VI-B metal content of said combination, and oxidizing said support modifier in an oxidizing atmosphere at a temperature of at least about 600°F sufficient to combust said modifier and oxidatively convert the same into volatile oxidation products thereof.

6. The method of claim 5 wherein said Group VI-B compound is ammonium molybdate, said support modifier is selected from the group consisting of polyglycols and sulfur, and said Group VI-B compound is reduced by reacting with a reducing agent selected from the group consisting of hydrazine and hydrogen sulfide.

* * * * *